INVENTOR.
Robert W. Stuart
Walter H. Hogan
BY
Attorney

United States Patent Office 3,430,455
Patented Mar. 4, 1969

3,430,455
THERMAL SWITCH FOR CRYOGENIC APPARATUS
Robert W. Stuart, Wakefield, and Walter H. Hogan, Wayland, Mass., assignors, by mesne assignments, to 500 Incorporated, Cambridge, Mass., a corporation of Delaware
Filed Apr. 17, 1967, Ser. No. 631,237
U.S. Cl. 62—383                    10 Claims
Int. Cl. F25d 3/12; F25b 9/00; G05d 23/00

ABSTRACT OF THE DISCLOSURE

A thermal switch is provided which automatically engages or disengages a thermal connection between two bodies. Heat is transfered first by metal-to-metal contact and then by gas conduction, the making or breaking of the contact being achieved through the use of metals having different coefficients of thermal expansion.

---

In cooling a body such as a detection device, for example a maser, to cryogenic temperatures which are down to within the range of liquid helium temperatures, it is desirable to be able to precool the body with refrigeration means having a relatively large capacity before achieving the final cooling with cold helium or liquid helium. Such an arrangement permits cooling the body relatively rapidly and efficiently down to about 40° K. for example. This then requires that some automatic means be provided to disengage the first refrigeration means and to continue the refrigeration by means of a lower-temperature, second refrigeration means such as circulating cold gaseous helium or liquid helium from a Joule-Thomson loop.

Many of the more recent cryogenic refrigerators are constructed as multistage devices, the temperature of the fluid in each succeeding stage being lower than the preceding stage (see for example U.S. Pat. 2,966,035 and U.S. Pat. 3,218,815). In the initial fluid cool-down in starting such a refrigerator it is advantageous to precool the successively colder fluid chambers (i.e., chamber 51 of FIG. 6 of U.S. Pat. 3,218,815). It has been found that if during a portion of this cool-down one or more of the smaller colder stages of the refrigerator is thermally coupled to a preceding stage of greater cooling capacity, the overall efficiency of the refrigerator and the speed with which the fluid is cooled to the desired temperature may be greatly increased. This improved performance, as in the case of the cooling of a detecting device, is due to the use of some of the cooling capacity of a larger stage to cool down one or more of the smaller stages to predetermined temperatures so that the amount of refrigeration for cooling the smaller stages to the desired temperature is greatly reduced. However, once the temperature of the lower stage, or stages, has been reduced to the predetermined temperature, it is desirable thermally to insulate one stage from the other so that each stage may attain a different temperature level. A need therefore exists for an automatic thermal switch which can thermally couple two stages together to provide heat transfer therebetween, but which insulates the stages from one another whenever a predetermined temperature is reached.

Automatic thermal switches are known. One of the first to be developed comprised an elongated cylindrical fluid-tight tubing containing a vaporizable fluid and operated on a cycle in which the fluid was alternately liquefied and vaporized, the heat transfer (and hence engagement) being effected by the vapor phase. A more recently developed thermal switch is described in U.S. Pat. 3,260,055. In this later device, two metal tubes are coaxially fitted one over the other and spaced from each other. Each of the tubes is sealed at an opposite end by a flange made of metal having heat conduction properties similar to those of the metal tubes. The two flanges are then sealed to a cylinder which contains both of the coaxially arranged tubes which are supported so as not to contact one another. The cylinder is filled with a gas which solidifies at a specific temperature and thus is capable of being cryopumped. The tubes and flanges are constructed of a metal which is a good heat conductor even at temperatures below the specified temperature, whereas the cylinder is constructed of a metal which is substantially a heat insulator at such a temperature.

The thermal switch of U.S. Pat. 3,260,055 functions satisfactorily but is difficult to construct because of the close tolerances which must be maintained between the concentric tubes while preventing them from forming metal-to-metal contact under all circumstances of use. The performance of such a thermal switch is therefore dependent upon very accurate initial construction and upon the employment of extreme care during use and handling. Moreover, there is no way of readily determining whether or not the tubes are functioning properly, i.e., are remaining out of contact, except to observe the performance of the overall cooling system being used. It would therefore be desirable to have an improved thermal switch which can be simply and easily constructed, and which does not require extreme care in handling and is reliable over its entire life period.

It is therefore a primary object of this invention to provide an improved thermal switch which is easily and simply constructed, and which does not require delicate handling procedures. It is another primary object of this invention to provide a thermal switch which exhibits improved performance over the previously described switches in that it begins operation with the heat transfer surfaces in contact and proceeds through at least a portion of its operating temperature range with surfaces in much closer proximity than could be reasonably maintained in the prior art devices. It is yet another object of this invention to provide a thermal switch of the character described which can be so constructed as to exhibit desired performance characteristics over a number of predetermined temperature ranges. Other objects of the invention will in part be obvious and will in part be apparent hereinafter.

The invention accordingly comprises the features of construction, combinations of elements and arrangements of parts which will be exemplified in the constructions hereinafter set forth, and the scope of the invention will be indicated in the claims.

For a fuller understanding of the nature and objects of the invention reference should be had to the following detailed description taken in connection with the accompanying drawings in which.

The thermal switch of this invention must be capable of first achieving heat transfer and then preventing it. This is accomplished by providing two metal members having contactable surfaces, the metal members exhibiting high thermal conductivity over the temperature range in which the thermal switch is to operate. The first member is adapted for thermal engagement with a first refrigerating means which serves as a heat sink and which generally has a greater refrigeration capacity than that used as a second refrigerating means. The second metal member is thermally linked to a heat source, i.e., the body to be cooled such as a detector or colder refrigerator stage. A fluid-tight enclosure, which incorporates the first member as a part thereof, defines a fluid-tight chamber around the second member. The first member is formed of a material which exhibits a larger coefficient of thermal expansion/contraction than the material from which the enclosure, exclusive of the first member, is formed. The fluid contained within the switch is one which is capable of conducting heat between the first and second members after they break surface contact during cooling by virtue of the differential in the coefficients of thermal expansion/contraction. The fluid is also capable of being condensed, through cryopumping, at a predetermined temperature which is the temperature chosen for disengagement of the switch.

In constructing the thermal switch of this invention, the first and second members are placed in surface contact, thus making it a relatively simple device to fabricate, requiring no high degree of care in component alignment. This surface contact will be broken when the second contactable member has been cooled sufficiently to contract and draw away from its surface contact with the first member and a thermal conducting fluid passage between the members will be defined.

Figure 1:
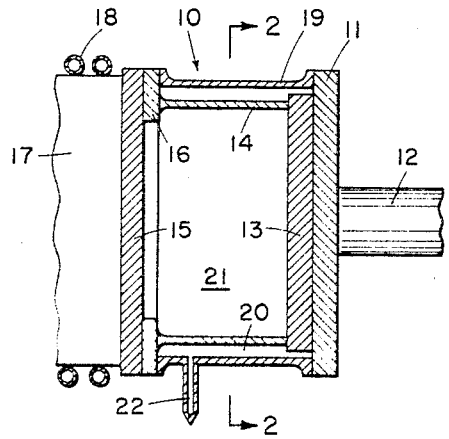
FIG. 1 is a longitudinal cross section of one embodiment of the thermal switch of this invention showing the position of the switch components during asembly.
Figure 2:
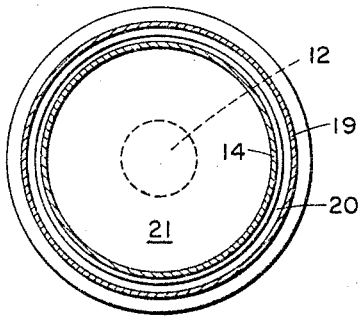
FIG. 2 is a cross section of the thermal switch taken along line 2—2 of FIG. 1.
Figure 3:
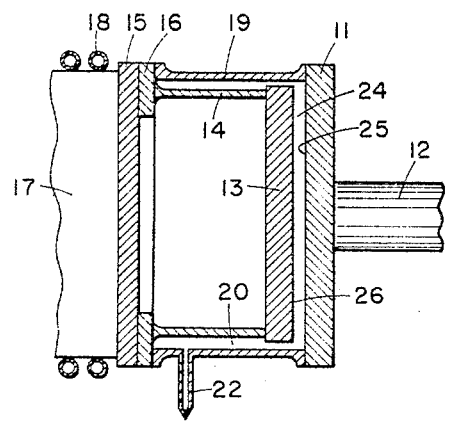
FIG. 3 is a longitudinal cross sectional of the thermal switch of this invention showing the position of the switch components during its use with cryogenic equipment.

FIGS. 1 and 3 are longitudinal cross sections of the thermal switch of this invention showing the two heat conducting members in the position they occupy during manufacture and installation (FIG. 1), and in the position these members occupy during operation and final cutoff (FIG. 3). FIG. 2 is a cross section of the thermal switch taken along line 2—2 of FIG. 1 and should be examined in connection with the drawings in FIGS. 1 and 2 in the following description. In FIGS. 1–3 like numerals are used to refer to like components in the switch.

The thermal switch of this invention is generally indicated by the numeral 10. It will be seen to be comprised of a first thermally conducting member 11 which is adapted to be brought into heat exchange relationship with a first refrigerating means, illustrated in FIGS. 1 and 3 as the last or coldest stage 12 of a multistage cryogenic refrigerator such as is described in U.S. Pat. 2,966,035 or 3,218,815. This first refrigerating means is in effect a heat sink in the overall heat transfer mechanism involved for it furnishes refrigeration to cool a mass to a predetermined temperature level.

A thermal conducting plate 13 is placed during manufacture in surface contact with the first member 11. Plate 13 is in turn affixed to a tubing 14 which in turn is mounted on a heat station plate 15 through a mounting ring 16. The heat station plate 15 in turn is adapted to be brought into heat exchange relationship with a mass 17 to be cooled (heat source) to a predetermined temperature before a second refrigeration means is used. This second refrigeration means is shown in FIGS. 1 and 3 as coils 18 suitable for circulating a cryogenic fluid such as cold gaseous helium or liquid helium from a Joule-Thomson loop (not shown).

The plate 13, tubing 14, heat station plate 15 and mounting ring 16 may be considered to make up a single second member providing a unified and continuous heat flow path between refrigeration means 12 and mass 17. It is necessary to provide a fluid environment around the second member and this is done by positioning it within an enclosure shown in FIGS. 1–3 to be a tubing 19 concentric with and surrounding tubing 14. The first member 11 forms a part of the fluid-tight chamber 20 and it is completed by mounting ring 16. The volume 21 within tubing 14 may be open to the atmosphere, contain air or be evacuated. The desired fluid is conveniently introduced into the chamber 20 through a fluid line 22 during manufacture, and the fluid line sealed off.

Tubing 19, in addition to providing a portion of the fluid-tight enclosure, serves to maintain the member 11 in a fixed position relative to the other components of the switch in a manner to permit plate 13 to move relative to it.

In the operation of the thermal switch it is necessary for plate 13 to move relative to member 11 and this is accomplished through a choice of materials having different properties at the cryogenic temperatures encountered. Thus that portion of the enclosure exclusive of member 11, i.e., tubing 19 must be formed of a metal which has a thermal coefficient of expansion/contraction which is less than that for the second member, particularly less than tubing 14 of the second member. It is also highly desirable for tubing 19 to exhibit a minimum of heat conduction over the operational temperature range to minimize heat leaks. Both the first and second members should be formed of materials which have good thermal conductivity over the operational temperature range of the switch. Although several metals are known to meet these physical property requirements, copper has been found to be preferable for the first and second members as well as for any heat station plate which may be used. Copper has both a good thermal conductivity and relatively high coefficient of thermal expansion/contraction at cryogenic temperatures. A number of iron-nickel alloys are known which possess relatively low thermal conductivities and coefficients of thermal expansion/contraction. As an example we may cite an alloy formed of 63.8% by weight Fe, 36% Ni and 0.2% C, sold under the tradename of Invar.

As refrigeration is supplied to member 11 it cools and in doing so cools plate 13, tubing 14, ring 16 and heat station plate 15. The cooling of tubing 14 causes it to contract while tubing 19 remains essentially the same length as it was originally made. This movement of plate 13 gives rise to a fluid gap 24, between first member 11 and plate 13, which becomes part of volume 20. So long as this gap 24 contains an appreciable number of gaseous molecules, heat transfer from plate 13 to member 11 can be effected.

Figure 11:
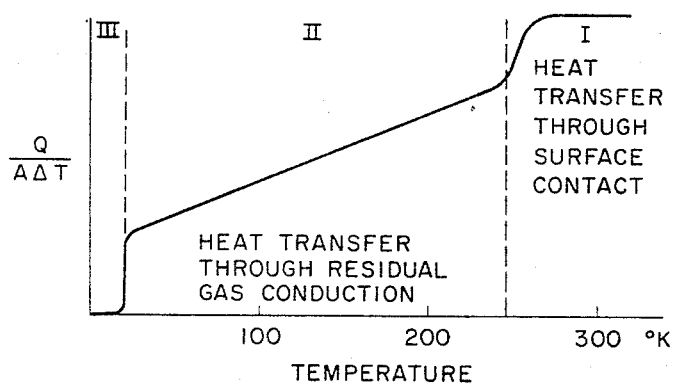
FIG. 11 is a plot of the heat transfer rate per unit surface area per unit temperature difference between the contacting metal surfaces.

Referring now to the plot of FIG. 11, it will be seen that there can be considered to be three stages in the operation of the thermal switch. Stage I is that during which metal-to-metal or surface contact is effected and is the condition in which the switch is originally made. Stage II is that period during which surface contact is broken but heat is transferred, at a decreasing rate, through gas conduction by fluid in gap 24. Finally, Stage III represents the free molecular conduction region which is reached as soon as the vacuum within gap 24 and chamber 20 reaches the point where heat transfer is a function of the pressure in the gap. Since the pressure falls off very rapidly with temperature in this region, the heat transfer rate similarly falls rapidly with temperature. The vacuum is created through cryopumping, that is the condensation of the gas molecules onto the cryogenically cooled surfaces 25 and 26 as well as on the wall of tubing 14. The point at which cutoff or Stage III begins may be preset by the proper choice of gas. Thus, for example, with neon in volume 20 the cutoff point and beginning of free molecular conduction is about 13° K. and for nitrogen about 35° K. It will generally be desirable to maintain gas pressures at subatmospheric levels, i.e, about 5–8 p.s.i.a. at room temperature in the switch. High fluid charge pressures could result in a solid condensed phase between the surfaces defining gap 24 which would result in effecting a less efficient thermal disassociation between the surfaces. With the cutoff of heat transfer, the switch is disengaged and refrigeration of mass 17 is continued exclusively by the second refrigerating means 18.

Figure 4:
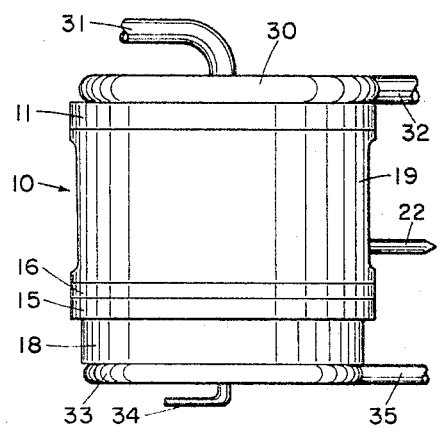
FIG. 4 is a side elevational view of the thermal switch of this invention illustrating an alternate means for supplying first or primary refrigeration.

The thermal switch of FIG. 4 is that which is shown in cross section in FIGS. 1–3. However, in place of the refreigerator 12, the primary refrigeration means takes the form of a coil 30 into which a cryogenic coolant (e.g., liquid nitrogen or hydrogen) is introduced at 31 and circulated for withdrawal at 32. Likewise, a coil 33 is provided for circulating a cryogenic coolant (e.g., liquid helium) as the second refrigerating means by introducing it at 34 and withdrawing it at 35.

Figure 5:
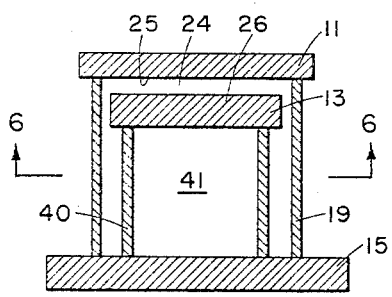
FIG. 5 is a longitudinal cross section of another embodiment of the thermal switch.
Figure 6:
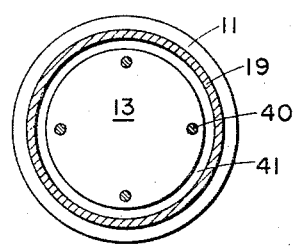
FIG. 6 is a cross sectional of the switch of FIG. 5 taken along line 6—6 of FIG. 5.

FIGS. 5 and 6 are cross sections of another embodiment of the thermal switch of this invention in which those elements which are the same as in FIG. 1 are given like reference numerals. In place of a tubing as a support and a contracting/expanding element, the switch of FIGS. 5 and 6 employs a plurality of rods 40 which join plate 13 with the mass to be cooled through the heat station plate 15. The fluid-tight enclosure is defined by member 1, tubing 19 and heat station plate 15 and the heat transfer fluid occupies the entire fluid volume 41.

Figure 7:
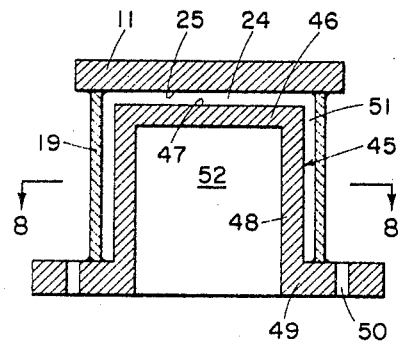
FIG. 7 is a longitudinal cross section of another embodiment of the switch.
Figure 8:
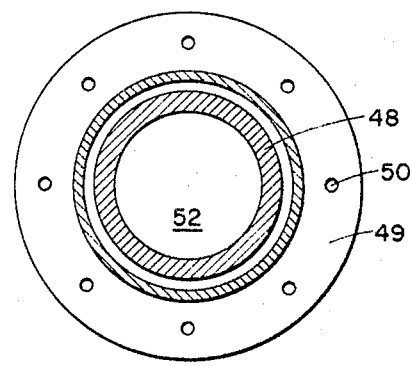
FIG. 8 is a cross section of the switch of FIG. 7 taken along line 8—8 of FIG. 7.

In the thermal switch of FIGS. 7 and 8 the second heat conducting member 45 is formed as a single piece. The top portion 46 is adapted for contact between its surface 47 and surface 25 of mmeber 11 during manufacture. (The switch is illustrated in FIG. 7 in operating condition.) Integral with the contacting portion 46 is cylindrical wall 48, the length of which varies with temperature, and flange 49 which is adapted, through holes 50, to be joined to a mass to be cooled. It will be seen that this modification eliminates the use of a heat station plate (e.g., plate 15 of FIG. 1) and that the tubing 19 of the enclosure is affixed directly to flange 49, defining a fluid-tight volume 51 including a gap 24 when plate 46 is out of contact with member 11.

Figure 9:
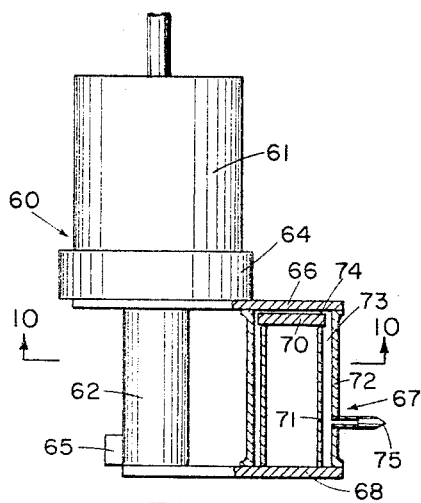
FIG. 9 is a side elevational view (partly in cross section) of a multistage cryogenic refrigerator having a thermal switch constructed in accordance with this invention.
Figure 10:
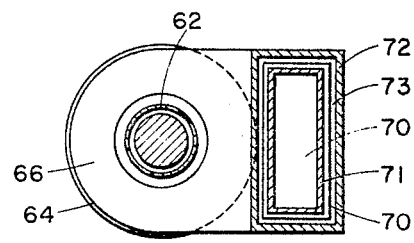
FIG. 10 is a cross section of the refrigerator and thermal switch of FIG. 9 taken along line 10—10 of FIG. 9.

In FIGS. 9 and 10 the thermal switch of this invention is shown between two stages of a cryogenic refrigerator such as described in U.S. Pat. 3,218,815. The refrigerator 60 has an upper or warmer (comparatively speaking) stage 61 and a lower or colder stage 62, each of which has a displacer, regenerator and fluid chamber as described in U.S. Pat. 3,218,815. The upper stage 61 has a heat station 64 (comparable to heat station 68 of FIG. 6 of U.S. Pat. 3,218,815) and is also shown to have a load represented by a mass 65 (comparable to load 86 of FIG. 6 of U.S. Pat. 3,218,815). The first member 66 of the switch is, in this embodiment, designed to make maximum contact with the bottom or cold end of refrigerator stage 61 and heat station 64 (see FIG. 6) as well as to afford a suitably shaped configuration for the rectangularly shaped thermal switch generally indicated at 67. In like manner, the heat station plate 68 is shaped to contact the end of the second stage 62 and form the bottom of the enclosure portion of the switch. As an alternate configuration the first member 66 and heat station plate 68 may fit around the cold chamber ends of stages 61 and 62 and contact the sides of heat station 64 and stage 62 rather than the bottom members as shown in FIGS. 9 and 10.

The thermal switch of FIGS. 9 and 10 is shown to have a rectangular configuration rather than a cylindrical one as shown in the preceding drawings. However, the components making up the switch are essentially the same. The second contactable member is formed of an end plate 70 and rectangular tubing 71 which is affixed directly to heat station plate 68. A concentric rectangular tubing 72 serves as the enclosure means along with a portion of upper member 66 and plate 68. Volume 73 is fluid-tight and a fluid gap 74 is provided (during operation) between member 66 and plate 70. There is finally a fluid filling conduit 75 shown to be sealed off.

From the description given above it will be seen that the thermal switch of this invention is simple to construct, rugged and reliable, and capable of being built to cover a range of operational temperatures in the cryogenic range.

It will be thus seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A thermal switch, suitable for controlling the flow of heat over cryogenic temperature ranges from a heat source to a sink, comprising in combination
   (a) a first heat conducting member adapted for thermal connection to a heat sink;
   (b) a second heat conducting member contactable through one of its surfaces with a surface of said first heat conducting member, said second member being arranged to transfer heat from said heat source the temperature of which is to be lowered to approximate that of said heat sink;
   (c) enclosure means incorporating said first heat conducting member and defining around said second heat conducting member a fluid-tight chamber; and
   (d) fluid within said chamber capable of conducting heat between said first and second members thereby to complete a heat flow path between said source and said sink, said fluid being condensable, through cryopumping, at a predetermined temperature at which temperature said switch is disengaged; said second member being formed of a first material which exhibits a larger coefficient of thermal expansion/contraction than a second material from which said enclosure means, exclusive of said first member, is formed.

2. A thermal switch in accordance with claim 1 wherein said first and second heat conducting members are copper.

3. A thermal switch in accordance with claim 1 wherein said enclosure means, exclusive of said first member, is formed of an iron-nickel alloy.

4. A thermal switch in accordance with claim 1 wherein said fluid is neon.

5. A thermal switch in accordance with claim 1 wherein said fluid is nitrogen.

6. A thermal switch in accordance with claim 1 wherein said second member comprises a first plate contactable with said first member and first plate supporting means formed of said first material; and wherein said enclosure means is formed of said first member, a thin-walled member of said second material and a heat station second plate formed of a thermally conducting material; said heat station second plate being in heat exchange relationship with said first plate through said first plate supporting means.

7. A thermal switch in accordance with claim 6 wherein said plate supporting means is a tubing which defines with said thin-walled member said fluid-tight chamber.

8. A thermal switch in accordance with claim 1 wherein said second member is a cylinder having a cover piece on one end to provide a surface for contacting with said first member, the other end terminating in a flange adaptable for joining said switch to said source, said flange serving as part of said heat enclosure means.

9. A multistage cryogenic refrigerator having a plurality of successively colder refrigerating stages, and having at least one of said stages thermally connected to a preceding refrigeration stage by a thermal switch whereby said one stage is precooled by refrigeration supplied by said preceding refrigeration stage until a predetermined temperature is reached at which time the thermal connection is automatically disengaged, characterized in that said thermal switch comprises (a) a first heat conducting member adapted for thermal connection to said preceding refrigeration stage;
(b) a second heat conducting member contactable through one of its surfaces with a surface of said first heat conducting member, said second member being arranged to transfer heat from said one stage;
(c) enclosure means incorporating said first heat conducting member and defining around said second heat conducting member a fluid-tight chamber; and
(d) fluid within said chamber capable of conducting heat between said first and second members thereby to complete a heat flow path between said one stage and said preceding stage, said fluid being condensable through cryopumping, at a predetermined temperature at which temperature said switch is disengaged; said second member being formed of a first material which exhibits a larger coefficient of thermal expansion/contraction than a second material from which said enclosure means, exclusive of said first member, is formed.

10. A thermal switch in accordance with claim 9 wherein said fluid is neon.

References Cited

UNITED STATES PATENTS

| | | | |
|---|---|---|---|
| 3,004,394 | 10/1961 | Fulton | 62—3 |
| 3,045,980 | 7/1962 | Isham | 165—10 |
| 3,177,933 | 4/1965 | Webb | 165—96 |
| 3,209,818 | 10/1965 | Steele | 165—135 |
| 3,225,820 | 12/1965 | Riordan | 62—383 X |
| 3,229,755 | 1/1966 | Komarow | 62—383 X |
| 3,296,825 | 1/1967 | Kanzig | 62—514 |
| 3,302,703 | 2/1967 | Kelly | 165—135 |

WILLIAM J. WYE, *Primary Examiner.*

U.S. Cl. X.R.

62—6; 165—32